United States Patent
Robinson

[11] Patent Number: 5,307,911
[45] Date of Patent: May 3, 1994

[54] TWO-WAY CLUTCH

[75] Inventor: Allen C. Robinson, Nanaimo, Canada

[73] Assignee: Inuktun Services Ltd., Nanaimo, Canada

[21] Appl. No.: 103,945

[22] Filed: Aug. 10, 1993

[51] Int. Cl.$^5$ .................................. F16D 41/08
[52] U.S. Cl. .............................. 192/31; 192/38; 192/44
[58] Field of Search .................. 192/44, 45, 38, 31

[56] References Cited

U.S. PATENT DOCUMENTS

| | | | |
|---|---|---|---|
| 2,028,512 | 1/1936 | Maier | 192/44 X |
| 3,300,002 | 1/1967 | Roper | 192/44 |
| 3,586,143 | 6/1971 | Hutchinson | 192/44 |
| 3,788,435 | 1/1974 | Prueter | 192/44 X |
| 3,882,814 | 5/1975 | Shimackas | 192/44 X |
| 3,990,555 | 11/1976 | Carullo | 192/44 X |
| 4,119,168 | 10/1978 | Fogelberg | 192/44 X |
| 4,184,575 | 1/1980 | Fogelberg | 192/44 X |
| 4,185,723 | 1/1980 | Kelbel | 192/44 X |
| 4,230,211 | 10/1980 | Goto et al. | 192/44 X |
| 4,296,848 | 10/1981 | Kagata et al. | 192/44 X |
| 4,434,878 | 3/1984 | Okubo | 192/44 X |
| 4,438,836 | 3/1984 | Kagata | 192/44 X |
| 5,101,946 | 4/1992 | Lederman | 192/45 |
| 5,117,954 | 6/1992 | Iga | 192/45 |
| 5,152,726 | 10/1992 | Lederman | 475/324 |

FOREIGN PATENT DOCUMENTS

| | | | |
|---|---|---|---|
| 331508 | 7/1930 | United Kingdom | 192/44 |
| 857520 | 12/1960 | United Kingdom | 192/44 |

Primary Examiner—Leslie A. Braun
Assistant Examiner—Andrea Pitts
Attorney, Agent, or Firm—C. A. Rowley

[57] ABSTRACT

A two-way free-wheeling clutch is formed between a drive shaft and a driven shaft concentric with and encircling at least a portion of the drive shaft that is formed by axially extending substantially chord forming portions. The chord forming portions cooperate with circular bearings interposed between the portions and a circumferential surface of the encircling portion of the driven shaft to drive the driven shaft from the drive shaft. Drive of the driven shaft by the drive shaft is obtained by relatively positioning the bearings and the portions so the bearings are toward the radial extremities of their respective chord portions a driving wedge is formed with the inner circumferential surface of the driven shaft. When the portions and the bearings are shifted to relatively position the bearings closer to the centre of the chord forming portions i.e. minimum radial position on the chord free rotation of the driven shaft freewheeling of the driven shaft is permitted. Circumferential movement of the circular bearings is impeded so that the relative positions of the circular bearings and their respective portions automatically change with a change in direction of rotation of the drive shaft or by simply stopping rotation of the drive shaft.

5 Claims, 1 Drawing Sheet

TWO-WAY CLUTCH

FIELD OF THE INVENTION

The present invention relates to a two-way clutch, more particularly, the present invention relates to a free wheeling two-way clutch controlled by the direction of rotation of the drive shaft.

BACKGROUND OF THE PRESENT INVENTION

There are many roller clutches available wherein the roller forms a rocking wedge between the driven and drive shafts to drive the driven shaft in a selected direction. Many of these devices are two-way devices and are generally relatively complicated in that some form of spring or shifting mechanism is required in order to change from a drive in one direction to a drive in the opposite direction.

U.S. Pat. No. 3,586,143 issued Jun. 22, 1971, to Hutchinson describes a clutch having an inner and outer clutch elements and which operates on the basis of pairs of rolling members that are biased into wedging position by a spring.

Many other free running clutch mechanisms employ rollers. Further examples of clutch free running clutch mechanisms are shown in U.S. Pat. No. 5,101,946 issued Apr. 7, 1992 to Lederman; U.S. Pat. No. 5,117,954 issued Jun. 2, 1992 to Iga; or U.S. Pat. No. 5,152,726 issued Oct. 6, 1992 to Lederman.

None of the clutch mechanisms are relatively simple and require separate shifting mechanisms when a two-way clutch is contemplated.

BRIEF DESCRIPTION OF THE PRESENT INVENTION

It is the object of the present invention to provide a relatively simple two-way free-wheeling clutch mechanisms that is easily shifted from driving at one direction to driving in the opposite direction.

Broadly, the present invention relates to a clutch mechanism comprising a drive shaft at least one axially extending substantially chord forming portion on said drive shaft forming a chord to an axis of rotation of said drive shaft, a driven shaft having a hollow portion concentric with said rotational axis of said drive shaft and mounted for rotation about said rotational axis, said hollow portion having a cylindrical inner surface concentric with said rotational axis and encircling said drive shaft along at an axial length of said drive shaft where said at least one flat portion is located, a bearing means contained between said at least one flat portion and said cylindrical inner surface, said bearing means having a circular periphery and is rotatable on a bearing axis substantially parallel to said rotational axis, said circular periphery having a diameter greater than the spacing between said flat portion and said cylindrical inner surface at the radial extremities of said chord formed by said flat portion but less than the spacing between said chord forming flat portion and said cylindrical surface at the centre of said chord forming portion between said radial extremities and means for retarding movement of bearing means.

Preferably, there will be a plurality of said flat portions each with its respective said bearing means and a bearing cage will interconnect all of said bearing means to maintain the circumference spacing between said bearing means about said rotational so that said bearing axes are circumferentially spaced so that when one of said bearing axes is positioned at the centre of said chord of its respective said flat portion all of said bearing axes are similarly positioned with respect to their respective said flat portions.

Preferably, said means for retarding movement of said bearing means will comprise friction means interposed between said bearing cage and a fixed member.

Preferably, said bearing means will be comprise roller bearings.

Preferably, said flat portions will arranged about said rotational axis to form a octagonal cross-sectional portion on said drive shaft.

Preferably, said drive shaft and said driven shaft will be rotatably mounted on said fixed member.

Preferably said means for retarding movement of said bearings will include means for generating limited friction between said bearing cage and said fixed member.

Preferably said means for generating limited friction will include an annular band mounted on said fixed member and concentric with said axis of rotation and a cooperating strip on said cage, said strip being in frictional contact with said band.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
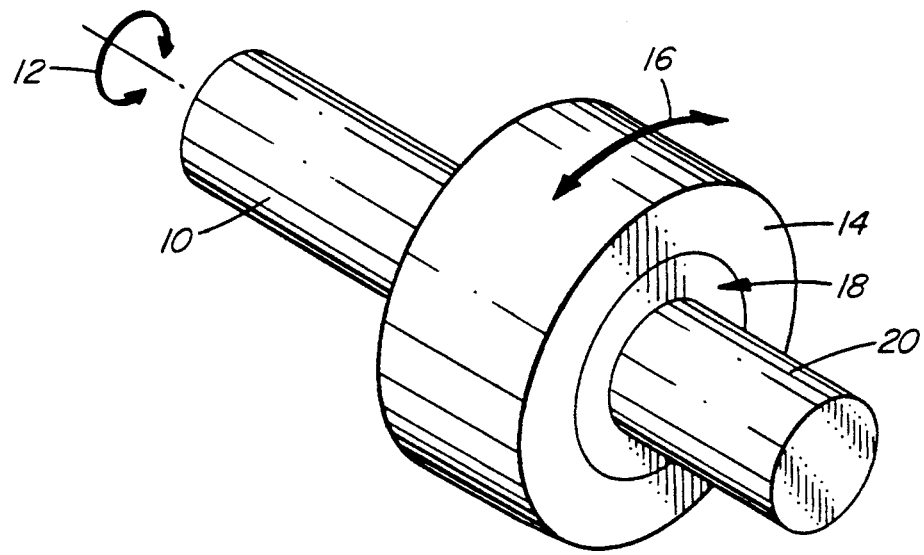
FIG. 1 is a schematic illustration of the present invention.

As shown in FIG. 1, the present invention is formed by a drive shaft 10 that may be driven in either direction as indicated by the arrow 12 and an output or driven shaft 14 which may be driven in either direction as indicated by the arrows 16 by the shaft 10 via the clutch mechanism 18.

In the illustrated arrangement, the drive shaft 10 and the output or the driven shaft 14 are supported on a fixed member in the form of a stub shaft 20 that is fixed to the machine frame.

The drive shaft 10 is mounted for rotation relative to the shaft 20 about rotational axis 40 on bearings 22 and 24 and is driven by a suitable gearing such as the gearing 26 which is also supported for rotation on axis 40 from the fixed shaft 20 via the bearing 22. Obviously the drive shaft 10 may be driven or powered by any suitable means.

Also mounted on the fixed shaft 20, is the driven shaft 14 which is supported from the shaft 10 fixed shaft 20 by bearings 28 and 30 respectively for rotation about the same rotational axis 40 as the drive shaft 10.

Figures 2, 3:
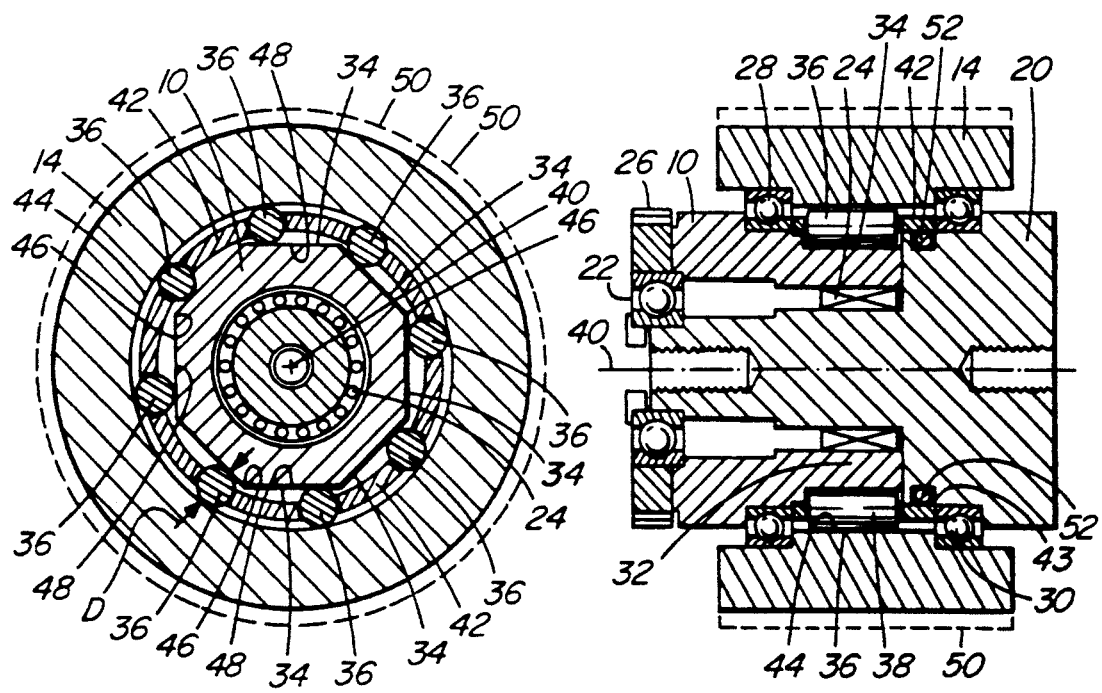
FIG. 2 is a transverse cross section of the clutch mechanism and the driven and drive shafts a gear drive version of the present invention.
FIG. 3 is an axial section of the version shown in FIG. 2.

A portion 32 of the shaft 10 is formed with substantially chord forming portions 34 which in the arrangement illustrated in FIG. 2 combine to form octagonal cross-section concentric with the shaft 10 ie centred on the rotational axis 40. These chord forming portions have been shown as true chords however it is not essential that they be true chords in that they need not be straight, but it desired may be curved eg. slightly concave and the term substantially chord forming as used in the disclosure and claims is intended to include such structures or configurations.

Each of the axially extending substantially chord forming portions 34 is provided with its respective cooperating circular bearing 36 which preferably will be a roller bearing having its rotational axis 38 substantially parallel to the rotational axis 40 of the shafts 10 and 14.

As shown, the bearings 36 are retained in fixed circumferentially spaced relationship by a bearing retainer or cage 42 which holds the various bearings 36 circumferentially spaced in positions to operate with their respective cooperating substantial chord forming portions 34 so that the axis 38 of each bearing 36 is in essentially the same circumferential position relative to its respective chord forming portion or surface 34 at any one time. For example, if the axis 38 of one of the bearings 36 is at a position radial of the centre 48 of its respective chord forming portion (i.e. midway between the radial extremities 46 of its chord portion measured circumferentially of the axis 40 which correspond with the shortest radius portion of the portions 34 relative to the axis 40), all the other bearing axes will be similarly positioned relative to their respective portions 34.

The driven shaft 14 as above indicated is concentric with the drive shaft 10, i.e. rotates about the same axis 40 and has a hollow section with a circular inner surface 44 that is concentric with the axis 40 and that cooperates with the rollers or bearings 36 and their respective chord forming portions 34 to obtain the clutching (driving) or free wheel operation.

The diameter D of each of the rollers 36 is greater than the radial spacing between the inner circular surface 44 and the radial extremities 46 at the ends of the chord forming portions 34 so that the rollers 36 are wedged between the flat surface 34 and the cooperating surface 44 when the rollers approach the radial extremities 46 of the portions 34. However, the diameters D are less than the radial spacing between the centre point 48 of each of the portions 34 and the circular (cylindrical) surface 44 of the hollow portion of driven shaft 14 so that when the rollers 36 are in their central position, i.e. spaced from the radial extremities 46 by a sufficient distance, the driven shaft 14 becomes free wheeling.

The shaft 14 may be coupled to other driven elements, for example, via the gear schematically indicated at 50.

It is important that means be provided to retard circumferential movement of the bearings 36 relative to the fixed shaft 20 and to this end, a friction ring 52 which may take the form of a suitable band 52 formed by an annular tube of suitable friction generating material is interposed between a cooperating annular axial extension strip 43 on the cage 42 and the fixed shaft 20 (see FIG. 3). The band 52 and annular strip 43 on the cage 42 are concentric with the axis 40 and cooperate to retard the movement of the bearings 36 relative to the fixed member 20. If desired the tube 52 could be inflatable to adjust the pressure retarding the relative motion between the cage 42 and the fixed member 20.

In operation, when the drive shaft 10 is rotated clockwise as indicated in FIG. 2, the rollers 36 are held by the friction between the band 52 and the cage 42 so the rotation of the shaft 10 moves the shaft 10 relative to the bearings 36 so that the bearings 36 are positioned toward the trailing radial extremity of their respective chord forming portions 34, i.e. to the chord extremity 46 trailing in the direction of rotation of the drive shaft 10, i.e. as the shaft 10 is rotated then the relative positions of the bearings and their respective chord forming portions 34 automatically shift counterclockwise until the driving force between the rollers 36 portions 34 and cylindrical surface 44 is stronger than the friction between the band 52 and the strip 43 of the cage 42 holding the roller cage 42 stationary, thereafter the driven shaft 14 is driven by the drive shaft 10 in the clockwise direction.

When it is decided to stop driving in the clockwise direction and permit the driven shaft 14 to free-wheel in the clockwise direction rotation of the shaft 10 is simply stopped which creates sufficient relative movement between the cage 42 (held by friction between the band 52 and the strip 43) and the shaft 10 to move the chord forming portions 34 relative to their respective the rollers 36 to permit the shaft 14 to freewheel in the clockwise direction.

The reversed happens when the shaft 10 is driven in the counterclockwise direction. In this case, the portions 34 and rollers 36 are relatively positioned again with the rollers toward the opposite trailing end 46 to which it moved when the shaft 10 was rotated in the clockwise direction and then drives the driven shaft 14 in the counterclockwise direction, i.e. when the wedging action of the rollers 36 between the surfaces 34 and 44 overcomes the friction between the ring 52 and cage 42 or fixed shaft 20, the driven shaft 14 is driven in the counterclockwise direction and as above described, when the rotation of the shaft 10 is stopped there will again be relative movement between the rollers 36 and the shaft 10 to position the rollers 36 closer to the centre point 48 of the portions 34, the driven shaft 14 again becomes free-wheeling, this time in the counterclockwise direction. If it is desired to ensure the shaft 14 is freewheeling in both directions rotation of the shaft 10 is stopped and the shaft 10 rotated slightly in the opposite direction to move the bearings 36 toward the centres 48 of their respective substantially chord forming portion 34.

Having described the invention, modifications will be evident to those skilled in the art without departing from the scope of the invention as defined in the appended claims.

I claim:

1. A clutch mechanism comprising a drive shaft, a plurality of axially extending substantially chord forming portions on said drive shaft each substantially forming a chord to an axis of rotation of said drive shaft, a driven shaft having a hollow portion defining a cylindrical inner surface concentric with said rotational axis of said drive shaft, said driven shaft being mounted for rotation on said rotational axis, said cylindrical inner surface encircling said drive shaft along an axial length of said drive shaft where said portions are located, a bearing means contained between each of said portions and said cylindrical inner surface, each of said bearing means having a circular outer periphery centered on and rotatable on a bearing axis substantially parallel to said rotational axis, said circular periphery having a diameter greater than a first spacing formed between its respective said portion and said cylindrical inner surface at radial extremities of said substantially chord formed by its respective said portion but less than a second spacing formed between its respective said chord forming portion and said cylindrical surface at a mid-point of its respective said chord forming portion between said radial extremities so that there is substantially no driving force provided between said drive shaft and said driven shaft when said bearing means are in a free wheeling position adjacent to said mid-point of their respective said cord forming portion, a cylindrical bearing cage concentric with said axis rotational axis, said bearing cage interconnecting all of said bearing means to maintain circumferential spacing between said bearing means about said rotational axis so that when one of said bearing axes is in free wheeling position with its bearing axis positioned circumferentially adjacent to said mid-point of said chord of its respective said portion all of said bearing axes are similarly positioned with respect to their respective said portions, an integral axial extension extending axially from said cage and encircling an annular portion of a fixed member, said integral axial extension having an inner cylindrical surface strip facing and encircling said annular portion, means for generating limited friction between said fixed member and said cage, said means for generating limited friction including an annular friction ring encircling and cooperating with said annular portion of said fixed member and having a circumferential surface bearing against said strip to frictionally retard rotational movement of said bearing cage relative to said fixed member.

2. A mechanism as defined in claim 1 wherein said bearing means comprises roller bearings.

3. A mechanism as defined in claim 2 wherein said portions are arranged about said rotational axis to form an octagonal cross-sectional portion on said drive shaft.

4. A mechanism as defined in claim 2 wherein said drive shaft and said driven shaft are rotatably mounted on said fixed member.

5. A mechanism as defined in claim 1 wherein said drive shaft and said driven shaft are rotatably mounted on said fixed member.

* * * * *